(12) United States Patent
Gruebele et al.

(10) Patent No.: US 11,788,916 B2
(45) Date of Patent: Oct. 17, 2023

(54) DISTRIBUTED SENSOR NETWORKS DEPLOYED USING SOFT GROWING ROBOTS

(71) Applicant: The Board of Trustees of the Leland Stanford Junior University, Stanford, CA (US)

(72) Inventors: Alexander M. Gruebele, Stanford, CA (US); Andrew C. Zerbe, Woodside, CA (US); Margaret M. Coad, Stanford, CA (US); Mark R. Cutkosky, Palo Alto, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 146 days.

(21) Appl. No.: 17/548,130

(22) Filed: Dec. 10, 2021

(65) Prior Publication Data

US 2022/0187153 A1    Jun. 16, 2022

Related U.S. Application Data

(60) Provisional application No. 63/124,472, filed on Dec. 11, 2020.

(51) Int. Cl.
   *B25J 9/14*    (2006.01)
   *G01M 3/04*    (2006.01)

(52) U.S. Cl.
   CPC .............. *G01M 3/04* (2013.01); *B25J 9/14* (2013.01); *B25J 9/142* (2013.01)

(58) Field of Classification Search
   CPC .................................... B25J 9/14; B25J 9/142
   See application file for complete search history.

(56) References Cited

U.S. PATENT DOCUMENTS

| | | | |
|---|---|---|---|
| 5,937,910 A * | 8/1999 | Chandler | B01J 2/18 264/269 |
| 6,354,330 B1 * | 3/2002 | Wood | B29C 63/0069 264/269 |

(Continued)

FOREIGN PATENT DOCUMENTS

| | | | | |
|---|---|---|---|---|
| CN | 110450138 A | * | 11/2019 | |
| CN | 110450149 A | * | 11/2019 | B25J 9/0009 |

(Continued)

OTHER PUBLICATIONS

Nathaniel Agharese et al., "HapWRAP: Soft Growing Wearable Haptic Device", 2018 IEEE International Conference on Robotics and Automation, May 21-25, 2018. (Year: 2018).*

(Continued)

*Primary Examiner* — David A. Rogers
(74) *Attorney, Agent, or Firm* — LUMEN PATENT FIRM (57) ABSTRACT

A distributed sensor network for soft growing robots is provided. Sensor bands are distributed at discrete intervals along the length of the flexible tube, and the sensor bands each are wrapped circumferentially around the diameter of the flexible tube. Each sensor band has one or more sensors and one or more semi-rigid islands containing a self-contained microcontroller, and one or more communication lines to an aggregator microcontroller located at the base of the soft growing robot communicatively connecting signals from the sensor bands. A casing laminates the distributed sensor network. In one example the encasing has cavities or a tooth geometry to allow bending. The casing is flexible to not hinder the growth of the soft growing robot, yet protecting the distributed sensor network.

4 Claims, 6 Drawing Sheets

(56) References Cited

U.S. PATENT DOCUMENTS

| | | | | |
|---|---|---|---|---|
| 6,478,054 | B1* | 11/2002 | Kiest | B29C 63/36 156/287 |
| 8,863,608 | B2* | 10/2014 | Fischer | B25J 9/142 92/92 |
| 9,261,221 | B2* | 2/2016 | Kiest, Jr. | F16L 55/1653 |
| 10,024,481 | B2* | 7/2018 | Kiest, Jr | F16L 55/1651 |
| 10,760,597 | B2* | 9/2020 | Kowalewski | F15B 15/10 |
| 10,954,789 | B2* | 3/2021 | Hawkes | B62D 57/021 |
| 11,081,975 | B2* | 8/2021 | Gandhi | H02N 1/006 |
| 11,432,979 | B2* | 9/2022 | In | A61G 7/1019 |
| 11,464,397 | B2* | 10/2022 | Abbott | B63H 21/17 |
| 11,605,793 | B2* | 3/2023 | Kim | H10K 77/111 |
| 11,633,849 | B2* | 4/2023 | Hawkes | B25J 11/00 74/490.01 |
| 2019/0217908 | A1* | 7/2019 | Hawkes | F01B 19/04 |
| 2021/0354289 | A1* | 11/2021 | Hawkes | B25J 11/00 |
| 2021/0394358 | A1* | 12/2021 | Ryu | B25J 15/0019 |
| 2022/0187153 | A1* | 6/2022 | Gruebele | G01D 21/02 |
| 2022/0355468 | A1* | 11/2022 | Coad | B25J 18/06 |
| 2023/0173666 | A1* | 6/2023 | Ryu | B25J 9/142 74/490.05 |

FOREIGN PATENT DOCUMENTS

| | | | | |
|---|---|---|---|---|
| CN | 113103212 | A * | 7/2021 | B25J 15/0408 |
| KR | 20190095653 | A * | 8/2019 | B25J 9/0009 |
| WO | WO-2021072295 | A1 * | 4/2021 | B25J 18/02 |

OTHER PUBLICATIONS

Pascal Auf der Maur et al., "RoBoa: Construction and Evaluation of a Steerable Vine Robot for Search and Rescue Applications", 2021 IEEE 4th International Conference on Soft Robotics, Apr. 12-16, 2021. (Year: 2021).*

Laura H. Blumenschein et al., "A Tip-Extending Soft Robot Enables Reconfigurable and Deployable Antennas", IEEE Robotics and Automation Letters, vol. 3, No. 2, Apr. 2018. (Year: 2018).*

Laura H. Blumenschein et al., "Design, Modeling, Control, and Application of Everting Vine Robots", Frontiers in Robotics and AI, Nov. 10, 2020. (Year: 2020).*

Margaret M. Coad et al., "Retraction of Soft Growing Robots Without Buckling", IEEE Robotics and Automation Letters, vol. 5, No. 2, Apr. 2020. (Year: 2020).*

Shivani Deglurkar et al., "A Phototropic Vine-Inspired Robot with Embedded Sensing-Actuation Loops", May 8, 2023. (Year: 2023).*

Lucia T. Gan et al., "3D Electromagnetic Reconfiguration Enabled by Soft Continuum Robots", IEEE Robotics and Automation Letters, vol. 5, No. 2, Apr. 2020. (Year: 2020).*

Elliot W. Hawkes et al., "A Soft Robot That Navigates its Environment Through Growth", Science Robotics, No. 2, Jul. 19, 2017. (Year: 2017).*

Sang-Goo Jeong et al., "A Tip Mount for Transporting Sensors and Tools using Soft Growing Robots", 2020 IEEE/RSJ International Conference on Intelligent Robots and Systems, Oct. 25-29, 2020. (Year: 2020).*

Rianna Jitosho et al., "Passive Shape Locking for Multi-Bend Growing Inflated Beam Robots", 2023 IEEE International Conference on Soft Robotics, 2023. (Year: 2023).*

Edoardo Milana, "Soft Robotics for Infrastructure Protection", Frontiers in Robotics and AI, Nov. 10, 2022. (Year: 2022).*

Chengjun Wang et al., "Soft Ultrathin Electronics Innervated Adaptive Fully Soft Robots", Advanced Materials, 2018. (Year: 2018).*

* cited by examiner

DISTRIBUTED SENSOR NETWORKS DEPLOYED USING SOFT GROWING ROBOTS

CROSS-REFERENCE TO RELATED APPLICATIONS

This application claims priority from U.S. Provisional Patent Application 63/124,472 filed Dec. 11, 2020, which is incorporated herein by reference.

STATEMENT OF GOVERNMENT SPONSORED SUPPORT

This invention was made with Government support under contract 2024247 awarded by the National Science Foundation. The Government has certain rights in the invention.

FIELD OF THE INVENTION

This invention relates to distributed sensor networks for soft growing robots.

BACKGROUND OF THE INVENTION

Distributed sensor networks are of growing interest for long-term monitoring of environments and structures, but they face limitations in how many sensors can be efficiently deployed, especially in constrained and hard-to-reach spaces. While wireless sensor networks can be designed for low power consumption using batteries or the ability to scavenge energy, they are often unable to transmit data reliably from enclosed spaces such as underground or through walls.

Soft growing robots have flexible tubes that grow when inflated due to tip eversion, either passively taking on the shape of the environment they grow into, or steered in free space using pneumatic muscles or with a pre-determined shape. Due to their flexibility, they can grow to long lengths in highly constrained spaces of unknown shape. To date, sensing for soft growing robots has been primarily focused on the tip of the robot through tools such as cameras. Because soft growing robots have a very low cost per unit length and are relatively easy to deploy, they can also be a platform for rapid deployment of sensor networks along the path of the growing robot body.

The present invention advances the art of soft growing robots with the addition of sensor networks.

SUMMARY OF THE INVENTION

A sensor network for soft growing robots is provided. A soft growing robot has a flexible tube that grows due to tip eversion. The flexible tube has a length and a diameter, and the soft growing robot distinguishes a base. A distributed sensor network has sensor bands distributed at discrete intervals along the length of the flexible tube, and the sensor bands each are wrapped circumferentially around the diameter of the flexible tube. Each sensor band has one or more sensors and one or more semi-rigid islands (e.g. flexible printed circuit boards (fPCBs) containing a self-contained microcontroller, and one or more communication lines to an aggregator microcontroller located at the base of the soft growing robot communicatively connecting signals from the sensor bands. An encasing laminates the distributed sensor network. In one embodiment the encasing has cavities or a tooth geometry to allow bending. The encasing is flexible to not hinder the growth of the soft growing robot, yet protecting the distributed sensor network.

In one embodiment, the sensors are for exteroception and proprioception. The sensors could be one or more sensors sensing temperature, humidity, acceleration, orientation, pressure, force, magnetic field, light intensity, chemicals, smoke, proximity, or any combination thereof.

BRIEF DESCRIPTION OF THE DRAWINGS

FIGS. 2A-C show according to an exemplary embodiment of the invention (FIG. 2A) a rendering of a growing robot deploying sensor bands, communicating with an aggregator DAQ via a bus along its axis.

DETAILED DESCRIPTION

In one embodiment, flex(ible) printed circuit board (fPCB) technology is used to create modular bands of sensors that are distributed along the robot, for continuous monitoring of the immediate environment. To spatially locate the sources of measurements, the shape of the grown robot is also sensed by measuring the orientation of each sensor band. Fpcbs allow for a wide array of traditional mems surface-mount sensors to be used without alteration, making this a versatile platform for many types of measurements. In one example of use of sensor modules, temperature, humidity, acceleration, and orientation was included. However, various types of sensors can be integrated.

Soft growing robots, and more broadly, many other soft robots, are inherently unstructured in how they bend and wrinkle. While fPCBs are robust and long-lasting when used within the design parameters, they have shortened lifetimes when subjected to curvatures outside those limits. Thus, traditional flexible circuits alone are not suitable for placement on soft growing robots. The inventors propose herein a combination of flexible circuit design and a semi-soft laminate that enforces safe bend radii of the fPCB during uncontrolled wrinkling. The laminate is designed for high flexibility so as to not hinder robot growth, while protecting the circuit in the directions in which bending occurs.

Much of the focus on designing sensor networks in the art has been on outdoor pipeline, environment, ecological habitat, and agricultural monitoring over large areas, necessitating the implementation of wireless data transmission. However, sensor networks are also being deployed in confined spaces that require a higher density of nodes and are close enough to be wired. These operate at a scale where stretchable wiring can be used to expand a network to cover large areas, such as strain gauges for aircraft structural monitoring or on robots. In enclosed spaces, this approach has benefits over wireless transmission, where electromagnetic waves can be attenuated depending on the obstructing material, such as soil or a wall.

Although the area of coverage of these networks is smaller than outdoor applications, deployment of large numbers of sensor nodes in small areas remains a challenge for both labor efficiency of setup, and precise knowledge of where the nodes (and therefore data source) are located spatially.

Soft growing robots have been used for sensor deployment including cameras and antennas, however work has been primarily focused on adding sensors to a tip mount. While this approach is useful for taking data along the path of the robot tip as it grows into constrained spaces, it does not use the length of robot left behind after growth for long-term monitoring of the space it grew into.

In many scenarios in which soft growing robots are used to deploy sensors, the shape of the robot must be measured to localize each node. Approaches to measuring curvature of soft robots include optical, capacitive, resistive, and mechanical methods using cables on encoders. All of these approaches require substantial sensor integration in the robot's fabrication process, and are challenging to integrate over the length scales reachable with soft growing robots.

Sensor Design

Figure 1:
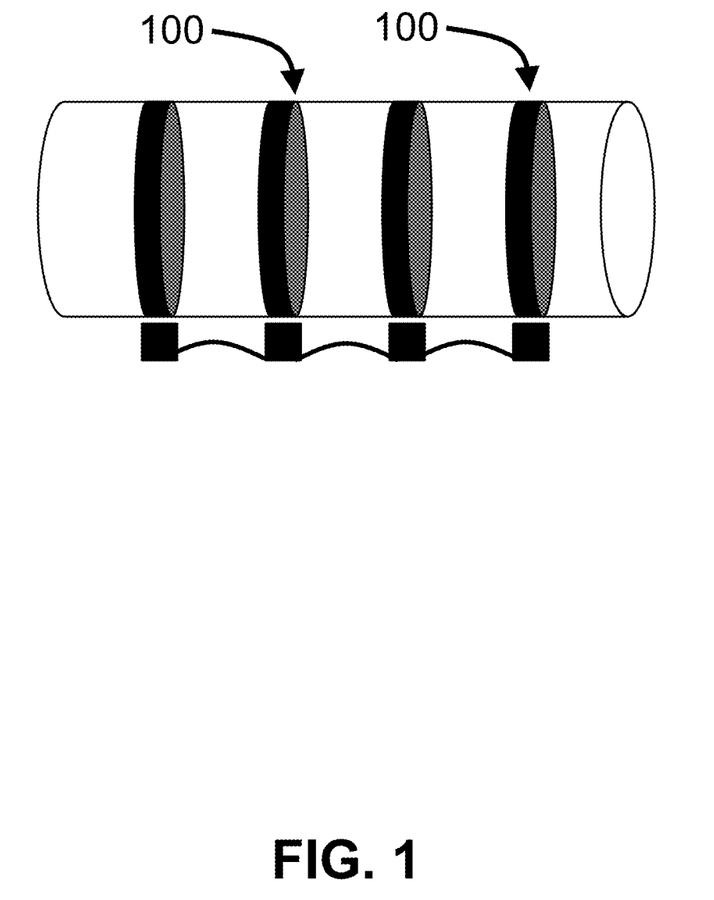
FIG. 1 shows according to an exemplary embodiment of the invention a soft growing robot (semi-transparent in this example) deploying armored sensor bands 100 (only two indicated for clarity) and sensing its shape as it traverses a bend (shown from top to bottom image).
Figure 2A:
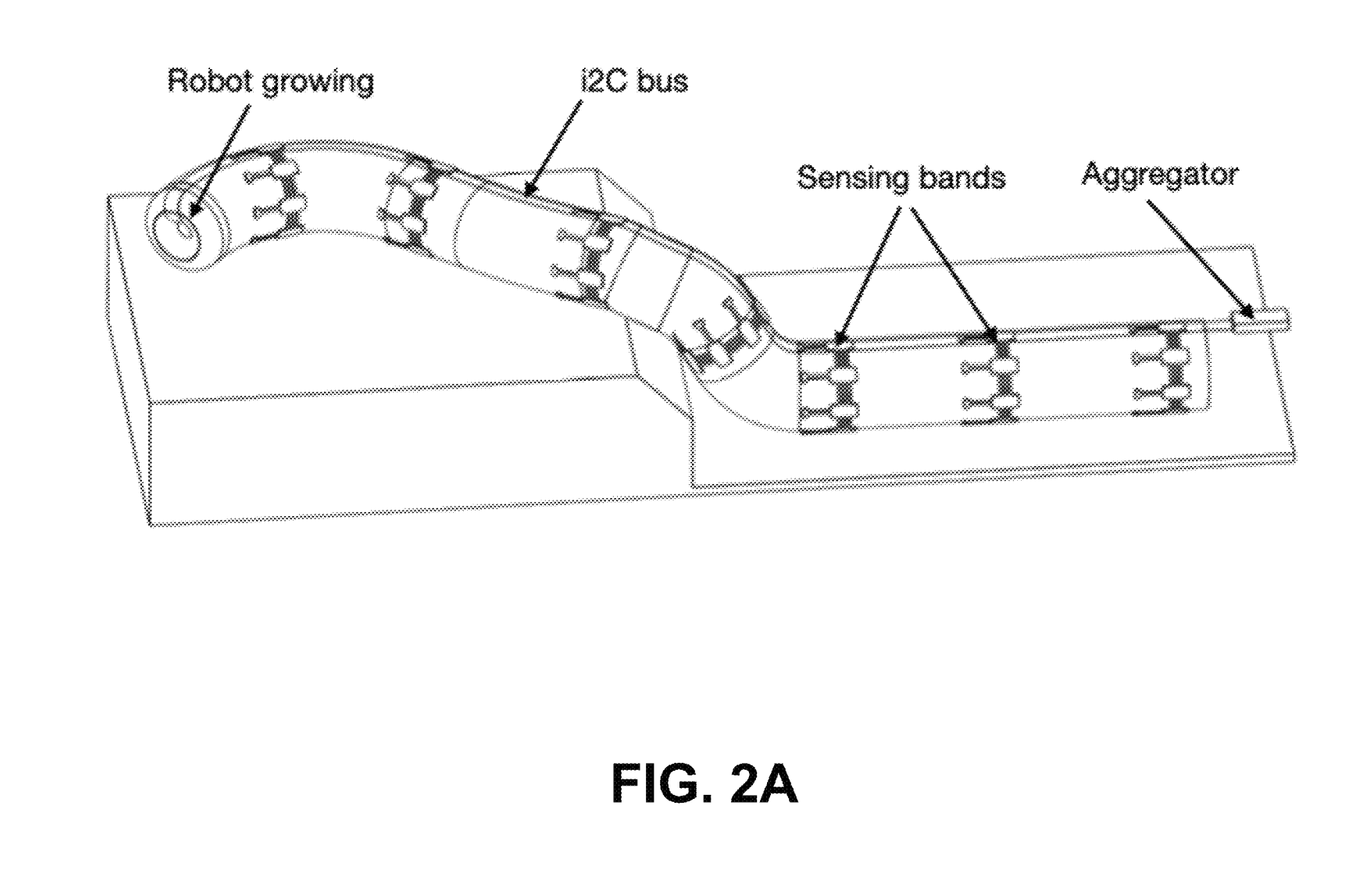
Figure 2B:
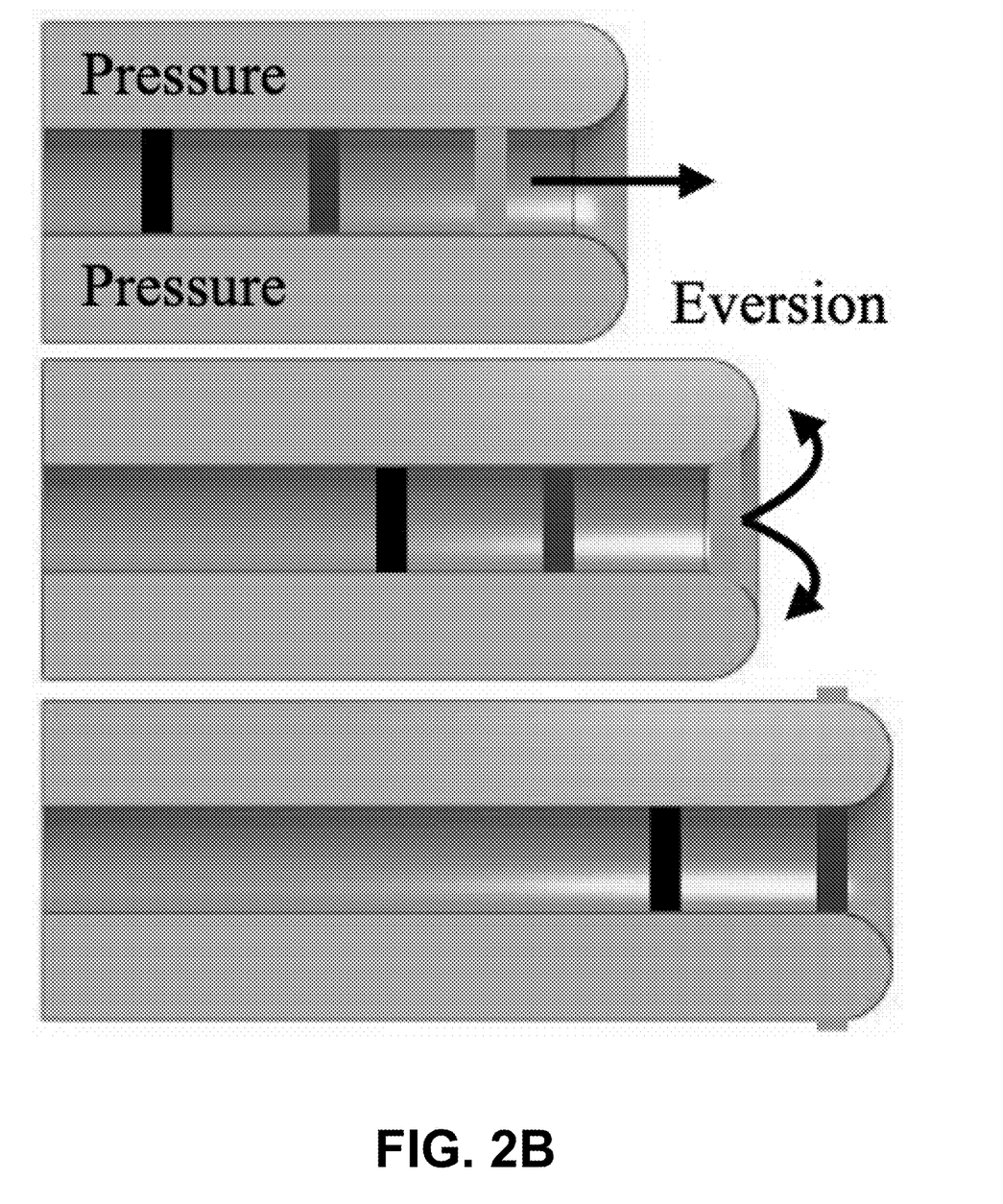
FIG. 2B, the process by which growing robots evert, illustrating the sensor band movement from the stowed state to the deployed state.
Figure 2C:
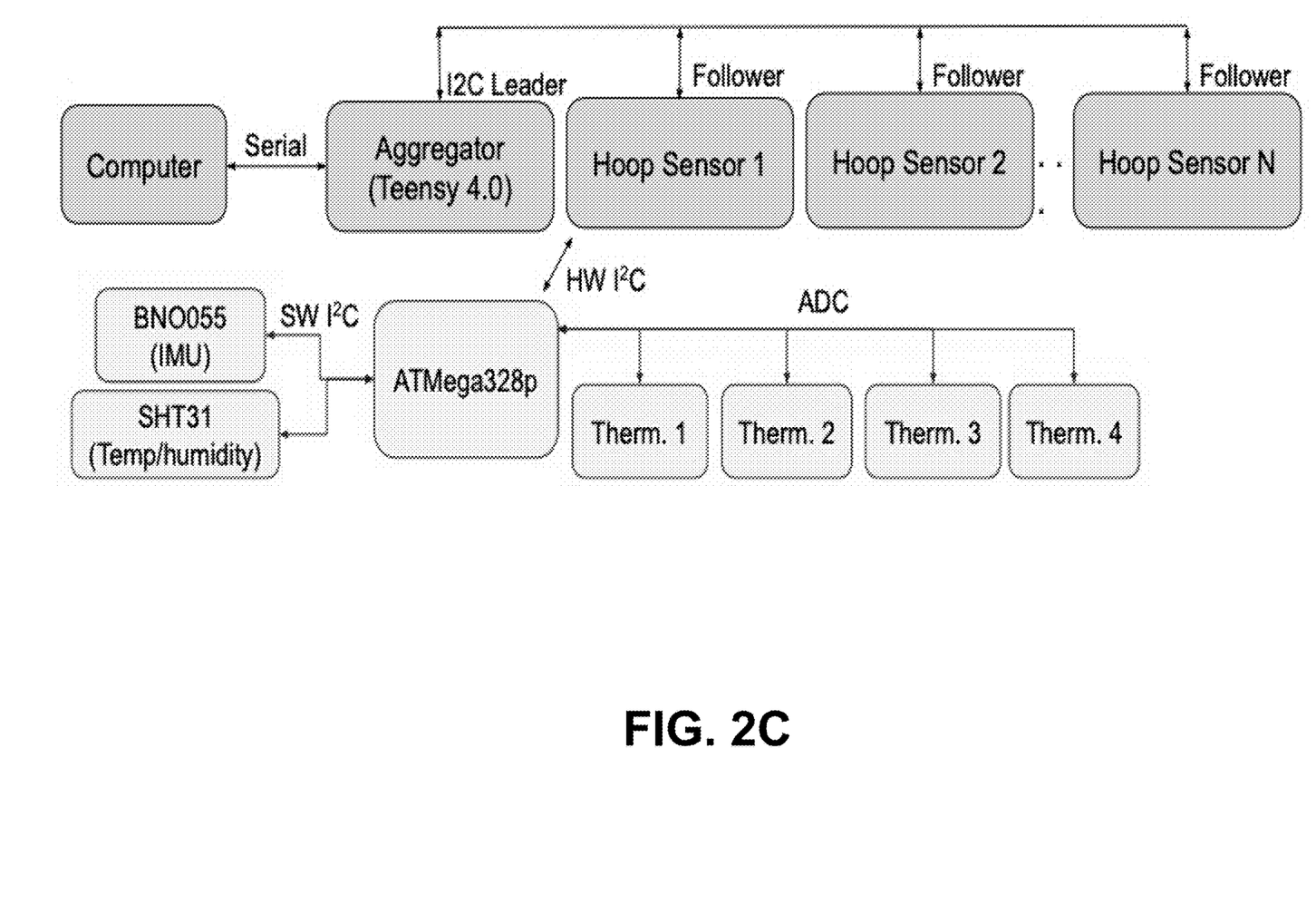
FIG. 2C, the overall system architecture, with the components on a single modular band shown in the bottom row of connected boxes.
Figure 3:
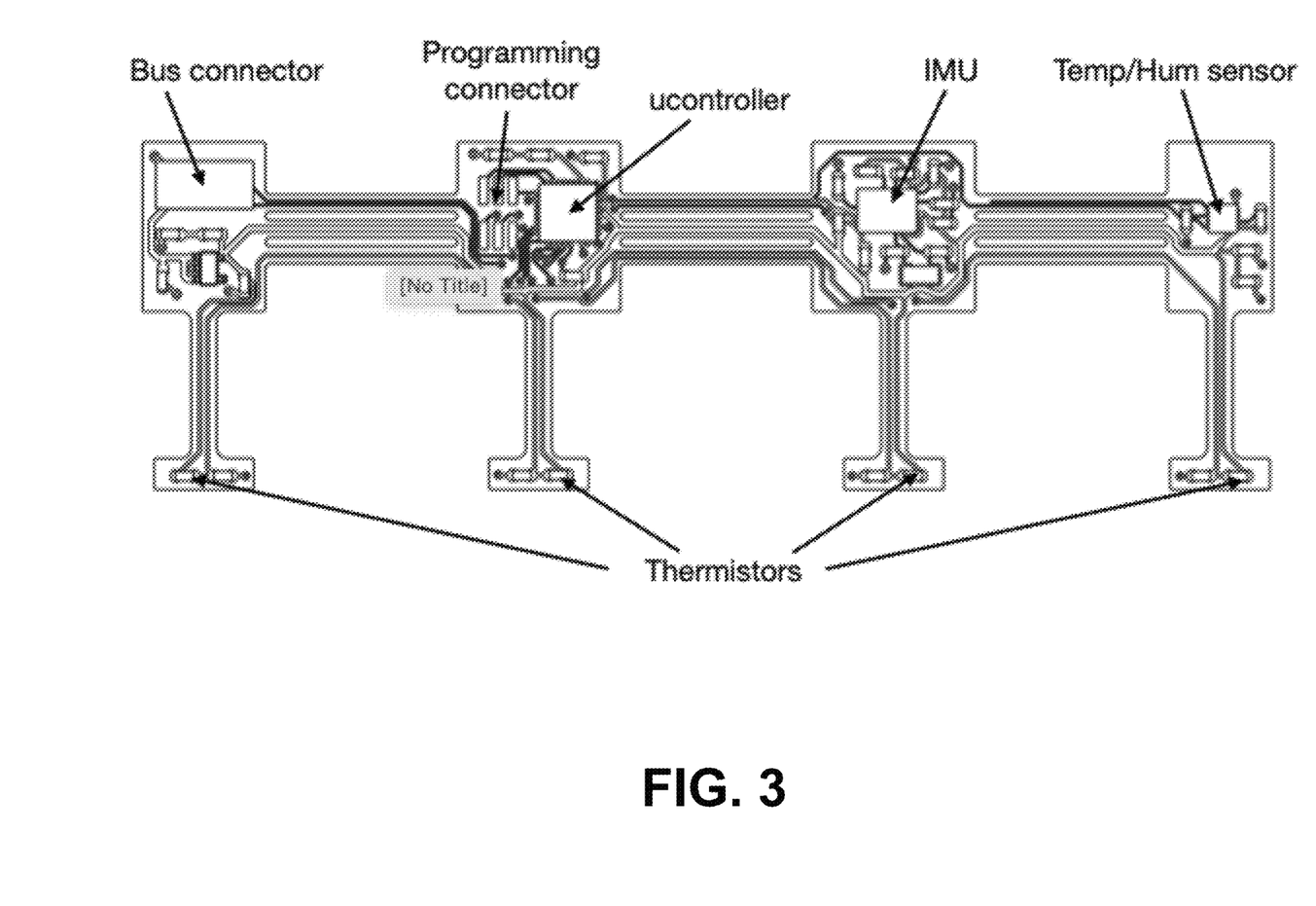
FIG. 3 shows according to an exemplary embodiment of the invention a flexible PCB band designed for growing robot deployment. Components are distributed in multiple semi-rigid islands, connected by highly flexible tracks with a sparsely filled ground layer. Many components that require directional sensing (such as the thermistors here) can be placed along additional islands which align with the axis of the robot.

A distributed sensor network is provided that can be deployed using soft growing robots (FIG. 1). There are two purposes for incorporation of sensors onto robots: exteroception (that is, sensing of external stimuli), and proprioception (that is, sensing of the state of the robot itself). The inventors sought to enable both of these purposes for soft growing robot sensing with a single design. For exteroception, a suite of sensors could be useful to allow monitoring of confined spaces. Depending on the application, sensing of temperature, humidity, light, and video could all be useful. In addition, by sensing the shape and contact conditions of the robot itself when deployed in an environment, information can be learned about the environment's shape and stiffness properties. For proprioception, sensing of robot shape and contact conditions can improve control of the robot during navigation and manipulation tasks. For some scenarios, sensors along one side of the robot body would suffice, but for other scenarios, sensors should be placed on all sides of the robot body to achieve the desired functionality.

In this invention, the aim was to develop a template sensor system in which the specific sensors could be switched out as needed, depending on the application. To demonstrate proprioception, the inventors chose to place IMUS along the length of the robot to sense its shape. To demonstrate exteroception and directional sensing capability, temperature and humidity sensors were placed along the length of the robot and thermistors distributed on all sides of the robot body. In other iterations of the design, these specific sensors could be replaced with cameras and contact sensors, for example, as needed.

To function on a soft growing robot, the sensor system needs to fulfill the following basic requirements. First, it needed to be attached to the soft robot body and endure repeated eversion and inversion without failure or significant encumbrance of the robot's ability to grow and retract. Second, it needs to be scalable to robot lengths suitable for navigation and manipulation tasks (ranging from 1 to 10 meters in length).

The sensor network (FIGS. 1, FIGS. 2A-C and FIG. 3) according to an exemplary design has an aggregator microcontroller (Teensy 4.0) located at the base of the robot and many fPCB sensor bands distributed along its length at discrete intervals. The sensor bands are adhered to the outside of the robot so that the sensors can monitor their direct surroundings when deployed. Each band is self-contained with its own microcontroller (Atmega328P-MU), reducing noise by performing digital conversions over short distances from analog sensors. Communication to the aggregator microcontroller is performed through a 4-wire i2C bus which runs the full length of the robot. This system is robust to failure of individual sensor bands, and uses a small number of flexible wires.

The sensor bands (FIG. 1, FIG. 2A and FIG. 3) according to an exemplary design has semi-rigid islands that contain the surface mount components, and flexible tracks which carry circuit traces between islands (fPCBs were produced by Seeed Studio with a 0.1 mm thick polyimide backing and cross-hatch ground pour beneath the flexible tracks for minimally stiff shielding). This design is chosen so that the bands can be wrapped circumferentially around the robot while exhibiting high flexibility so as to not impede growth of the robot or damage the circuit. The flexible islands are in a two-dimensional network: the main islands have the non-directional components (I2C devices, microcontroller, peripheral components, and bus-connector); the smaller islands contain the directional sensors. This approach is scalable, as it allows for a chain of directional sensors to be added down the axial direction of the robot, rather than increasing the size of the rigid islands (and therefore reducing band flexibility). The bands are attached to the robot with Tegaderm adhesive film, resulting in a robust adhesion that still allows the flexible tracks to bend during eversion.

In one example, sensors on each band could include an IMU (Bosch BNO055), a temperature/humidity sensor (Sensirion SHT31-DIS-B2.5kS), and four thermistors (TDK NTCG163JF103FT1S). In other applications, measurements that could be integrated into the platform using standard SMD chips include contact, force, air pressure, ambient light, gas composition, pH, and proximity.

Since soft robots often undergo unpredictable motions, flexible sensors adhered to these robots are at risk of undergoing bends and wrinkles that would break fragile connections to surface mount components and the conductive traces that connect them. Most manufacturers recommend that dynamic flex circuits have a minimum bend radius over traces of at least 100 times board thickness so that the copper does not work harden or succumb to cyclic fatigue.

Figure 4:
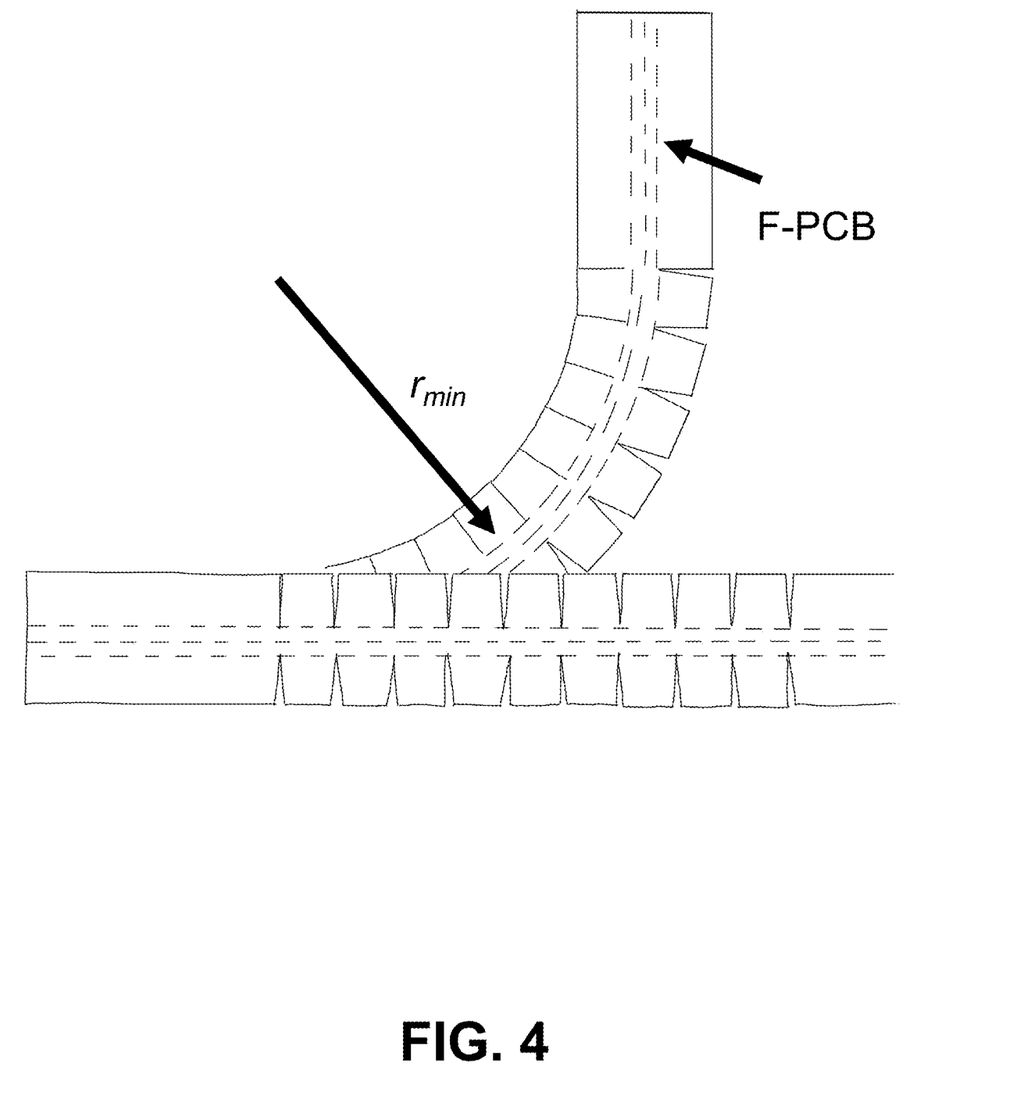
FIG. 4 shows according to an exemplary embodiment of the invention the elastomer armor (encasing) enforces a minimum band radius while maintaining high flexibility, only jamming at the necessary curvature. The armor is molded as one piece per side, and laminated onto the fPCB using an adhesive-backed Kapton intermediate layer.

To enforce this minimum bend radius, an armor laminate was designed to protect the fPCBs (FIG. 4), which encases the circuits on top and bottom. Over the functional islands, the laminate is stiff and has cavities that fit snugly over the SMD components, protecting them from damage and providing strain relief to the soldered connections. Over the flexible tracks, the laminate has very low stiffness (so as to not hinder deployment) until the minimum bend radius is reached, at which point the teeth mesh and prevent further bending (FIG. 4). Tooth geometry can be varied depending on the allowable bend in the application. The laminate is fabricated by pouring Vytaflex 60 polyurethane into a 3D printed mold. Once cured, it is adhered to a 3 mil thickness Kapton sheet with adhesive backing, and this is then applied to the top and bottom of the sensor band.

Demonstrations

Deployable sensor networks are of interest in many long-term monitoring applications, and applications in which the robot can provide data from places that are otherwise hard to access are described below.

Deployable Temperature and Humidity Sensing

In a first demonstration, the robot is deployed between a tight cluster of steam pipes to identify the location of leaks. Using a small entry point to enter the wall and pinpoint the leak location can reduce the amount of damage done to the wall to access the pipes behind it. The robot is able to grow in the constrained space between the pipes, and measure humidity and temperature over time, with thermistors measuring temperature at four discrete intervals encompassing the top half of the robot's circumference.

Shape Sensing in a Constrained Space

In a second demonstration, shape sensing is used in three-dimensional space by deploying the robot into a constrained pipe such that the first sensor band is at the entry point, and the last comes out the exit. This application mimics growth into an unknown path such as an animal burrow, for mapping tunnels in ecological studies.

Endoscopic Maneuvering and Sensing

In a third demonstration for endoscopic procedures it is desirable to detect the path the endoscope is taking to make sure that it is taking the desired trajectory, especially in cases where it can be actively steered. The combination of a growing robot and distributed sensing can allow a growing endoscope to passively (or actively with steering) follow a path without imparting shear forces on walls of the channel it is growing into, while sensing that the desired path is being followed.

Further details, experiments and validations related to these embodiments can be obtained from U.S. Provisional Patent Application 63/124,472 filed Dec. 11, 2020, which is incorporated herein by reference.

What is claimed is:

1. A sensor network for soft growing robots, comprising:
   (a) a soft growing robot having a flexible tube that grows due to tip eversion, wherein the flexible tube has a length and a diameter, and wherein the soft growing robot distinguishes a base;
   (b) a distributed sensor network comprising sensor bands distributed at discrete intervals along the length of the flexible tube, and wherein the sensor bands are each wrapped circumferentially around the diameter of the flexible tube,
      wherein each sensor band comprises one or more sensors and one or more semi-rigid islands containing a self-contained microcontroller, and one or more communication lines to an aggregator microcontroller located at the base of the soft growing robot communicatively connecting signals from the sensor bands; and
   (c) an encasing laminating the distributed sensor network, wherein the encasing comprising cavities or a tooth geometry to allow bending and wherein the encasing is flexible to not hinder the growth of the soft growing robot, yet protecting the distributed sensor network.

2. The sensor network as set forth in claim 1, wherein the one or more semi-rigid islands are flexible printed circuit boards (fPCBs).

3. The sensor network as set forth in claim 1, wherein the one or more sensors are for exteroception and proprioception.

4. The sensor network as set forth in claim 1, wherein the one or more sensors comprise sensors for temperature, humidity, acceleration, orientation, pressure, force, magnetic field, light intensity, chemicals, smoke, or proximity.

* * * * *